United States Patent

Yamagishi

[11] Patent Number: 5,854,875
[45] Date of Patent: *Dec. 29, 1998

[54] INFORMATION RECORDING APPARTUS CONNECTABLE TO PLURAL TYPES OF INFORMATION RECORDING MEDIA FOR RECORDING INFORMATION

[75] Inventor: Yoichi Yamagishi, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 402,306

[22] Filed: Mar. 10, 1995

Related U.S. Application Data

[63] Continuation of Ser. No. 45,256, Apr. 13, 1993, abandoned.

[30] Foreign Application Priority Data

Apr. 16, 1992 [JP] Japan .................................... 4-096704

[51] Int. Cl.$^6$ .................................................. H04N 5/781
[52] U.S. Cl. .............................. 386/120; 369/50; 369/54; 369/58
[58] Field of Search ................................ 369/53, 54, 58, 369/47, 50; 360/35.1, 33.1, 71; 358/906, 335; 365/228, 226; 386/46, 117, 118, 120, 121

[56] References Cited

U.S. PATENT DOCUMENTS

| 4,800,533 | 1/1989 | Arakawa | 365/226 |
| 5,126,971 | 6/1992 | Lin et al. | 360/126 X |
| 5,155,722 | 10/1992 | Yoshida | 369/116 |
| 5,189,524 | 2/1993 | Yoshida et al. | 360/71 |
| 5,222,008 | 6/1993 | Yamagishi et al. | 360/137 |

OTHER PUBLICATIONS

IEEE Spectrum, Oct. 1993 "Flash Memory Goes Mainstream", Brian Dipert and Lou Hebert, Intel Corp. pp. 48–52.

*Primary Examiner*—W. R. Young
*Attorney, Agent, or Firm*—Fitzpatrick, Cella, Harper & Scinto

[57] ABSTRACT

A recording apparatus includes a detecting device for detecting a status of a power supply; a determination device for determining a type of a connected storage medium; and a control device for controlling a recording mode based on (i) a determination by the determination device, and (ii) a detection by the detecting device.

32 Claims, 11 Drawing Sheets

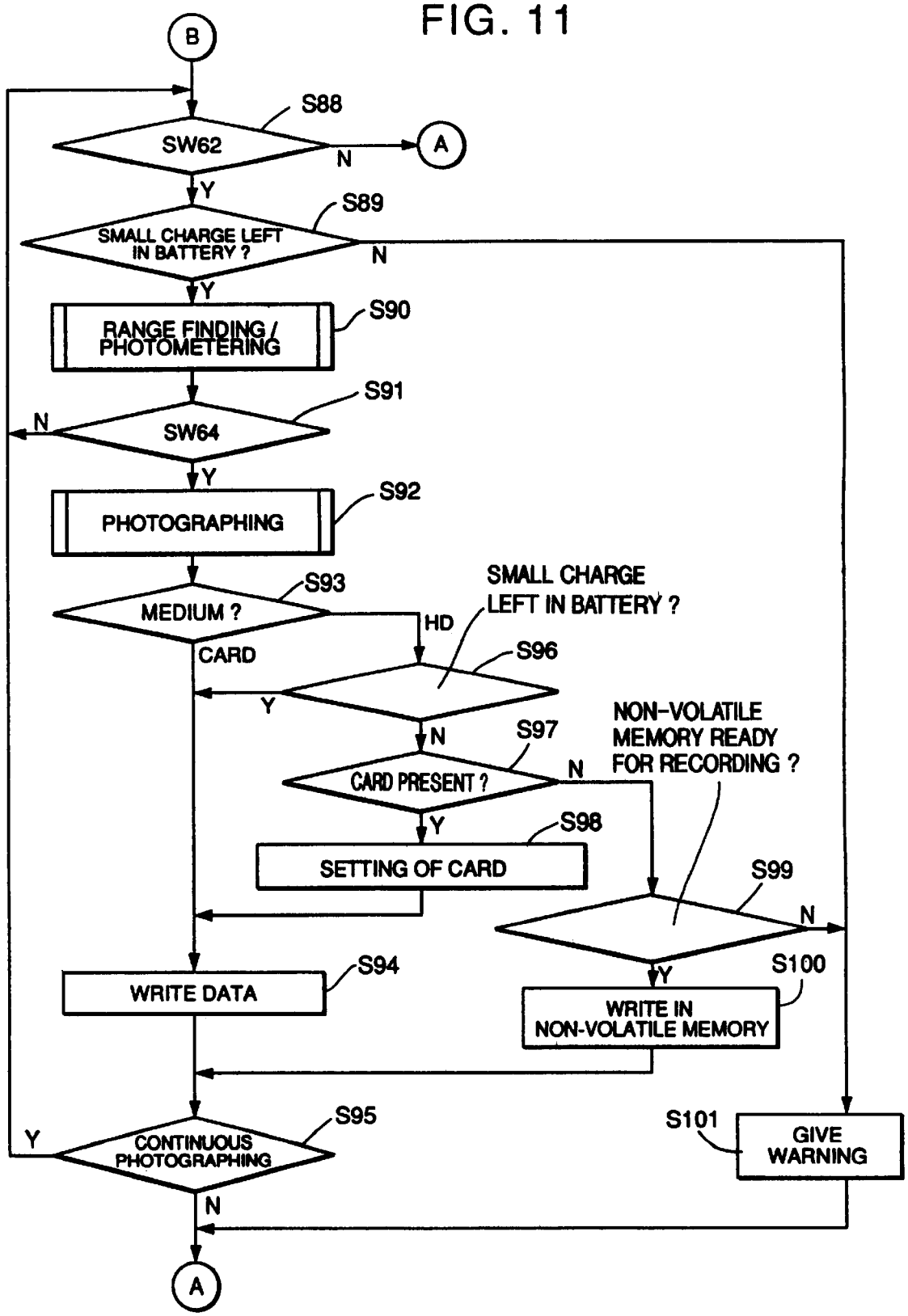

INFORMATION RECORDING APPARTUS CONNECTABLE TO PLURAL TYPES OF INFORMATION RECORDING MEDIA FOR RECORDING INFORMATION

This application is a continuation of application Ser. No. 08/045,256 filed Apr. 13, 1993, now abandoned.

BACKGROUND OF THE INVENTION

1. Field of the Invention

The present invention relates to a recording apparatus for recording information signals on a recording medium.

2. Description of the Related Art

An example of such a recording apparatus is an electronic still camera capable of recording still images and sound and which is already commercially available. It uses a magnetic disk called a still video floppy and the like as a recording medium. Also, an electronic still camera which uses a memory card with solid-state memory elements, such as DRAMs, SRAMs or EEPROMs, as a recording medium, has been proposed.

However, in the present state of the art, the memory card has limited recording capacity from the point of view of memory integration and the number of memory elements which can be mounted. In contrast, if a large-capacity magnetic recording medium typically represented by a hard disk is used, large-capacity recording is possible and is relatively inexpensively.

However, although large-capacity recording is possible relatively inexpensively with an electronic still camera using a hard disk, because a large electric current is required at start-up time, there are times when recording is not possible or fails because the battery is too weak. In an electronic still camera using a memory card, since a large electric current is not required, recording is possible even if there is a small charge left in the battery. However, recording with a large capacity is relatively expensive.

In addition to the above-described electronic cameras, similar problems arise in computers having a recording function, word processors, telephone sets and the like.

SUMMARY OF THE INVENTION

In view of the above-described circumstances, it is an object of the present invention to provide a recording apparatus capable of efficiently performing recording with low power consumption.

It is another object of the present invention to provide a recording apparatus which can be used for various purposes.

It is a further object of the present invention to provide a recording apparatus capable of recording satisfactorily irrespective of the state of the power supply.

To achieve the above objects, according to one aspect of the present invention, there is provided a recording apparatus which is capable of being connected to different types of recording media, and which is capable of recording information signals on a connected recording medium. Detecting means for detecting the state of a power supply; identifying means for identifying the type of connected recording medium; and switching means for switching the operation mode of the recording apparatus on the basis of the result of the identification by the identifying means and the detection by the detecting means.

It is still a further object of the present invention to provide a recording apparatus suitable for recording images.

It is still a further object of the present invention to provide a recording apparatus having novel functions.

The above and further objects and novel features of the invention will more fully appear from the following detailed description when read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 11 is a flowchart showing another embodiment of that of FIG. 9.

DESCRIPTION OF THE PREFERRED EMBODIMENTS

Preferred embodiments of the present invention will be explained below with reference to the accompanying drawings.

Figure 1:
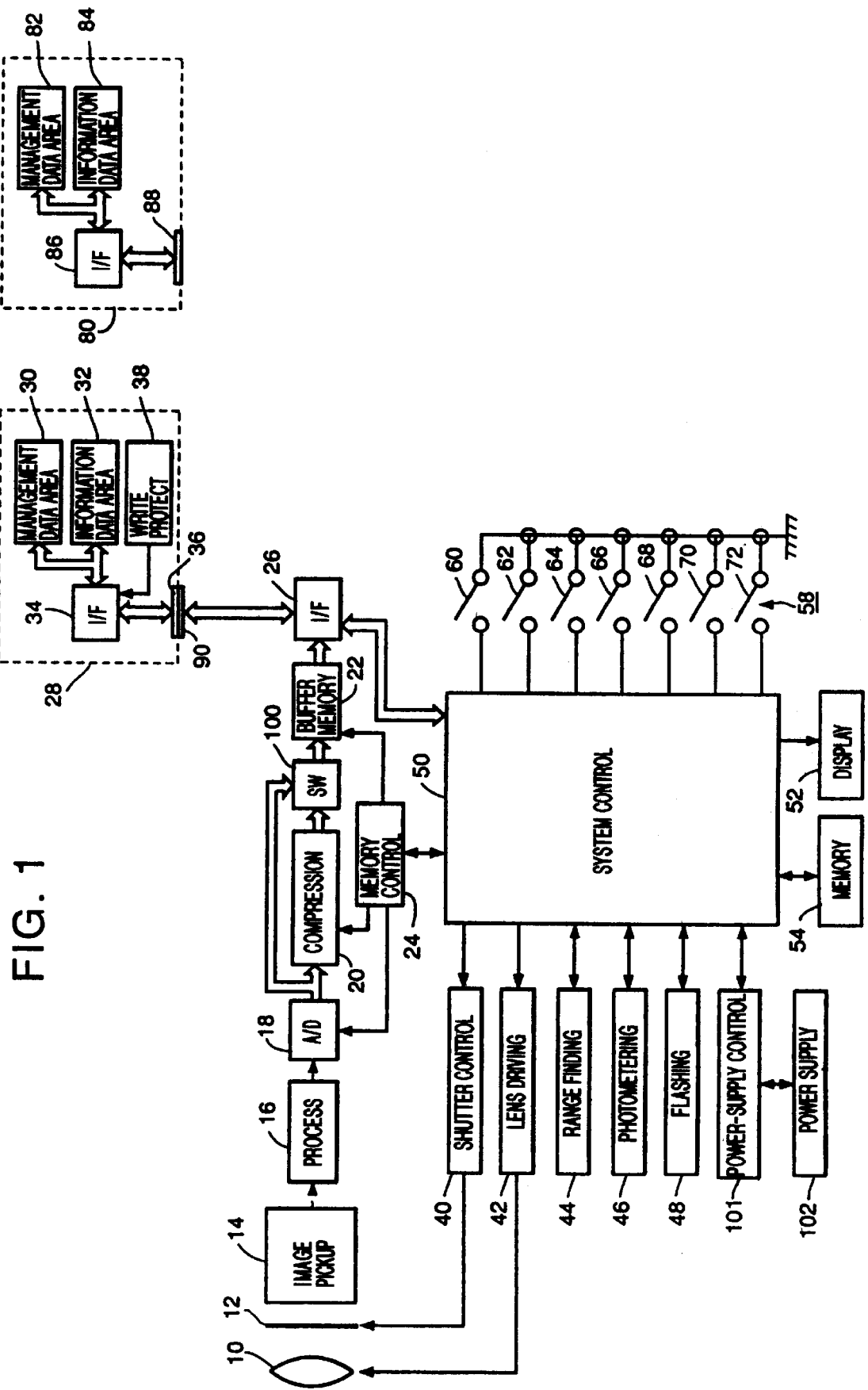
FIG. 1 is a block diagram in accordance with an embodiment of the present invention.

Referring to FIG. 1, reference numeral 10 denotes a photographic lens; reference numeral 12 denotes a shutter having a diaphragm function; reference numeral 14 denotes an image pick-up element for converting an optical image into electrical signals; reference numeral 16 denotes a process circuit for performing a well-known camera signal processing operation such as gamma correction; reference numeral 18 denotes an A/D converter for converting an analog output from the process circuit 16 into digital signals; reference numeral 20 denotes an image compression circuit for compressing data on the basis of adaptive discrete cosine transformation (ADCT) or the like; reference numeral 100 denotes a switch for switching between image compressed data and image non-compressed data; reference numeral 22 denotes a buffer memory; reference numeral 24 denotes a memory control circuit for controlling the A/D converter 18, the image compression circuit 20, and the buffer memory 22. When data is compressed by the image compression circuit 20, the compressed data is written in the buffer memory 22 under the control of the memory control circuit 24; when no compression is performed, data from the A/D converter 18 is written in the buffer memory 22. Reference numeral 26 denotes an interface with a memory card 28 or a hard disk 80; and reference numeral 90 denotes a connector.

There is a management data area 30 and an information data area 32 in the recording area of the memory card 28. Information stored therein is read out to the outside via an interface 34 and a connector 36. Information on a write protect 38 (inhibition of writing) is also read out to the outside via the interface 34 and the connector 36. The interface 34 is formed of a control circuit such as a CPU or a microcomputer unit (MPU), non-volatile memories such as ROMs or EEPROMs, and RAMs. The interface 34 controls the memory card 28 in accordance with preset programs.

There is a management data area 82 and an information data area 84 in the recording area of the hard disk 80. Information stored therein is read out to the outside via an interface 86 and a connector 88. The interface 86 is formed of a control circuit such as a CPU or a MPU, non-volatile memories such as ROMs or EEPROMs, and RAMs. The interface 86 controls the hard disk 80 in accordance with preset programs.

Reference numeral 40 denotes a lens driving circuit for driving a focusing lens of the photographic lens 10; reference numeral 42 denotes a shutter driving circuit for driving the shutter 12; reference numeral 44 denotes a range finding circuit for measuring the distance to an object; reference numeral 46 denotes a photometering circuit for measuring the brightness of the object; reference numeral 48 denotes a flash for irradiating light onto the object; reference numeral 50 denotes a system control circuit for controlling the entire apparatus; reference numeral 52 denotes a display device, such as a liquid-crystal display device, for displaying an operating state; and reference numeral 54 denotes a memory for storing constants, variables or the like for the operation of the system control circuit 50.

Reference numeral 58 denotes a group of switches for inputting various operation instructions from the system control circuit 50. The group of switches 58 includes a main switch 60; a range finding/photometering switch 62 for giving instructions on range finding and photometering by the photometering circuit 46 and the flash 48, which switch 62 is closed while an unillustrated release button is being operated; a release switch 64 for giving instructions on recording of a produced image onto the memory card 28 or the hard disk 80, which switch 64 is closed when the operation of the unillustrated release button is completed; a mode switch 66 for selecting a single (S) mode in which one or one set of photographs is taken, a continuous (C) mode in which a plurality of or a plurality of sets of photographs are taken, and a self-timer photographic mode; an image mode switch 68 for selecting image recording methods, such as the number of images to be recorded, a determination of frame recording/field recording, aspect ratio, pixel structure, compression method, or compression ratio; an erasure mode switch 70 for selecting an erasure mode; and an erasure switch 72 for giving instructions on the execution of an erasure operation.

Reference numeral 101 denotes a power-supply control circuit for detecting the state of the power supply and controlling it; reference numeral 102 denotes a power supply which is formed of a battery, a DC-DC converter, a switch for switching a block to which an electric current is supplied and the like, which switch is controlled by the power-supply control circuit 101. The power-supply control circuit 101 detects whether or not a battery is mounted, the type of the battery and the amount of the charge left in the battery, and controls the power supply 102 on the basis of the result of this detection and the instruction from the system control circuit 50. Detection of such an amount of the charge left in the battery may be performed in such a way as to detect a drop in the voltage of the power supply when a predetermined load, for example, a resistor, is connected to the battery.

The system control circuit 50 drives the focusing of the photographic lens 10 by means of the lens driving unit 42 in accordance with the result of the measurement by the range finding circuit 44 in order to bring the photographic lens 10 into focus. Also, the system control circuit 50 causes the shutter control circuit 40 to determine the time during which the shutter 12 is open so that the optimum exposure amount is obtained in accordance with the result of the measurement by the photometering circuit 46.

Figure 2:
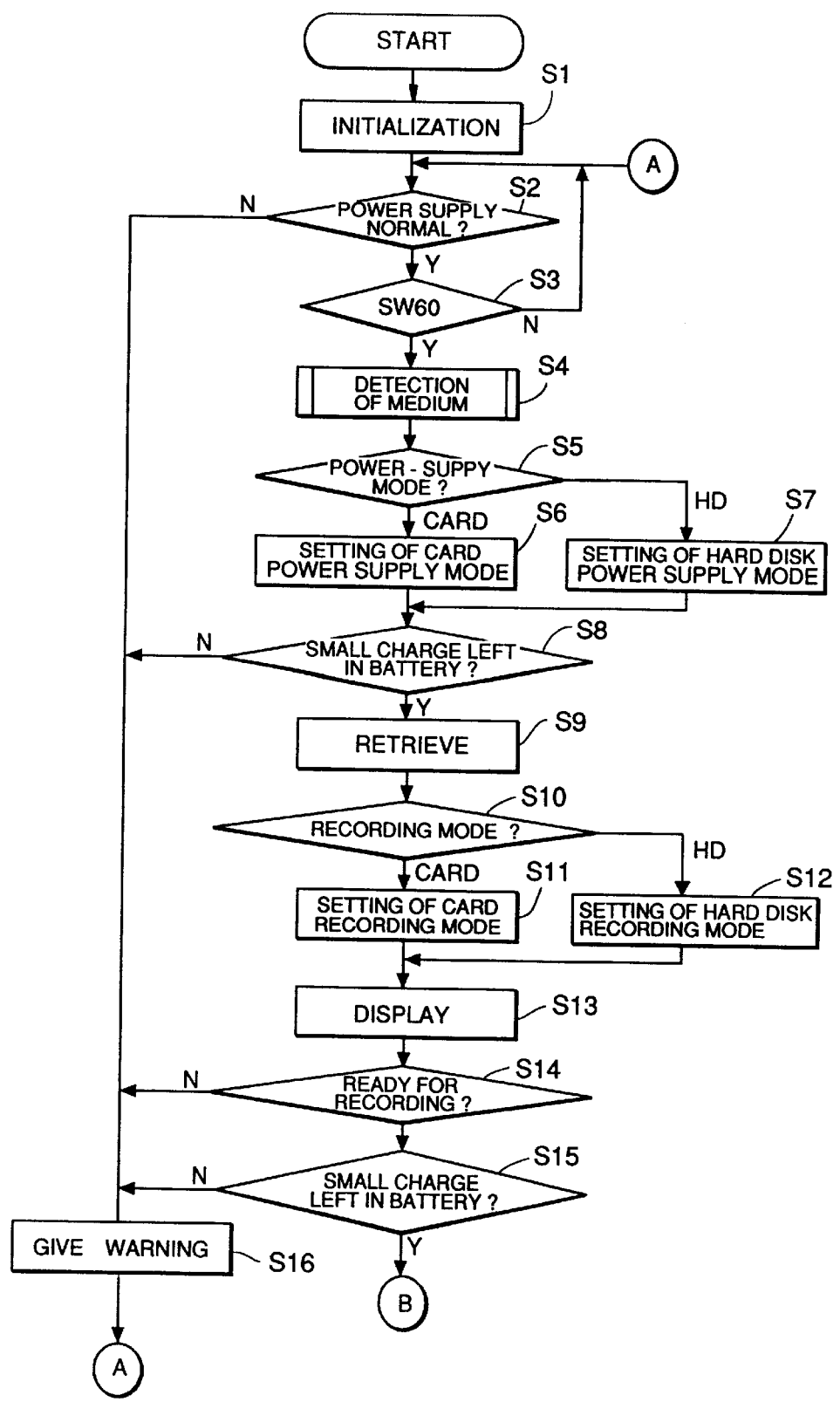
FIG. 2 is a part of a flowchart of the main routine in accordance with the embodiment of the present invention.
Figure 3:
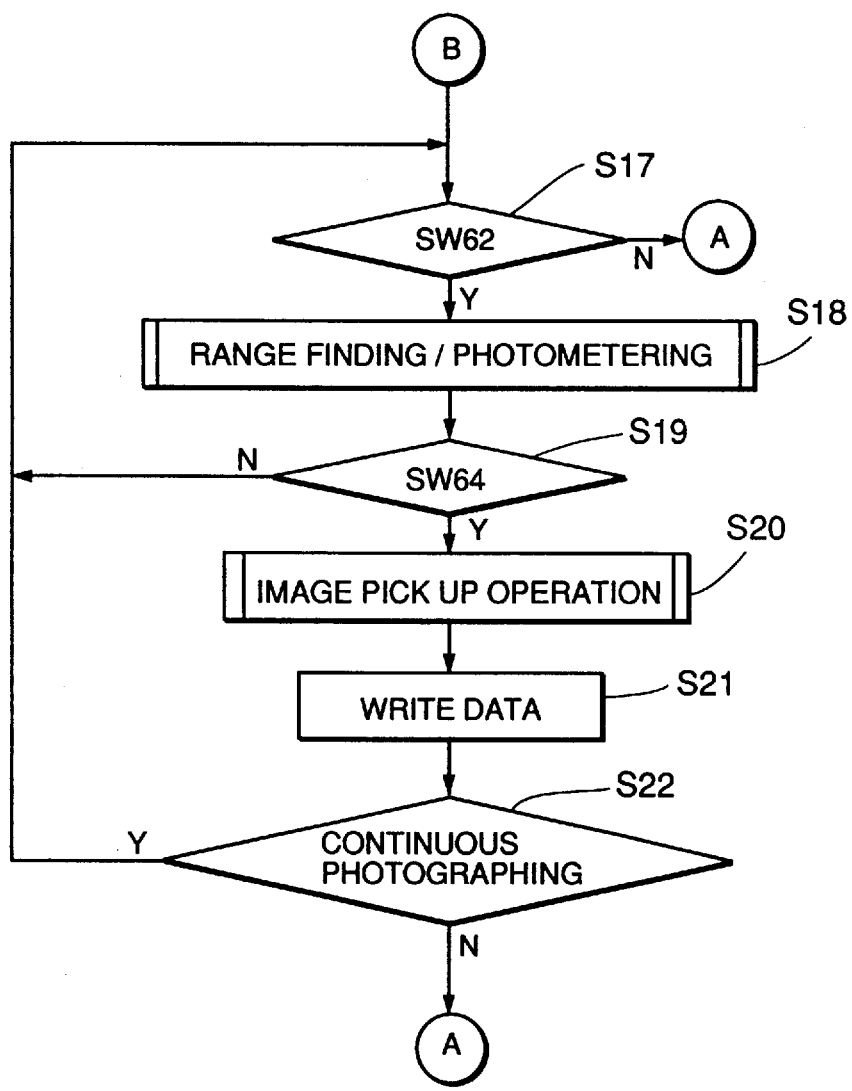
FIG. 3 is a part of the flowchart of the main routine in accordance with the embodiment of the present invention.

The first embodiment of the present invention will now be explained with reference to FIGS. 2 to 6. FIGS. 2 and 3 together show a flowchart of the main routine of this embodiment.

Upon turning on the power supply 102 in step S1, flags, control variables and the like are initialized by the system control circuit 50, and the state of the power supply is checked thereby in step S2. When the main switch 60 is closed in step S3, in step S4, whether the memory card 28 or the hard disk 80 is connected is detected by the system control circuit 50. The details of this operation for detecting a recording medium will be described later with reference to the second embodiment.

If, in step S2, the state of the power supply is not normal, for example, no battery is mounted or the amount of the charge left in the battery is exceedingly small, a warning is displayed on the display device 52 in step S16, and the power supply is checked, the process then waiting for the main switch 60 to be operated (S2 and S3, respectively). The control variables for use in a detection/control operation of the power-supply control circuit 101 and the mode are switched (S6 and S7) in accordance with the medium identification flag set at the medium detection operation S4. As a result, a threshold value which is a reference for an operation for giving a warning about the amount of the charge left in the battery and for an operation for inhibiting recording due to an insufficient amount of the charge left in the battery is set to the most appropriate value according to the type of the connected medium.

For example, a large electric current is required at start-up time when the hard disk 80 is connected, whereas no large electric current is required when the memory card 28 is connected. When the amount of the charge left in the battery is small, the operation for giving a warning about the amount of the charge left in the battery and the operation for inhibiting recording must be performed when the hard disk 80 is connected. When the memory card 28 is connected, in a case where recording can be continued without performing the above operations, recording must be inhibited if a threshold value is fixed despite the fact that the charge left in the battery is sufficient for recording when a memory card is connected. This embodiment can deal with any case in which any medium is connected by switching such threshold values.

In the system control circuit 50, the amount of the charge left in the battery 102 is detected by the power-supply control circuit 101 on the basis of the value set in step S6 or S7 corresponding to the connected medium (S8). If the amount of the charge left in the battery is sufficient, management data of the memory card 28 or the hard disk 80 is retrieved (S9). If the amount of the charge left in the battery is insufficient, a warning is displayed on the display device 52 (S16), and the process returns to Flow A. The process then waits for the main switch to be operated 60 (S2 and S3).

The setting of the operation mode and the display mode is performed (S11 and S12) in accordance with the medium identification flag set in the medium detection operation S4. That is, in the case of a memory card, a memory card record display is performed, and in the case of a hard disk, a hard disk record display is performed.

The number of frames, date, the operation mode, and the like are displayed (S13) on the basis of the management data, the mode set by the group of switches 58 and the mode setting switching in accordance with the medium identification flag. If it is determined in step S14 that no free area for recording is available in the information data area 32 or the information data area 84, and if it is determined in step S15 that no charge sufficient for recording is left in the battery on the basis of the value set in step S6 or S7 corresponding to the connected medium, a warning is displayed (S16), and the power supply is checked in step S2, the process then waiting for the main switch 60 to be operated in step S3.

If, in step S17, the range finding/photometering switch 62 is off, the process returns to step S2; if it is on, range finding and photometering are performed by the range finding circuit 44 and the photometering circuit 46, respectively. The photographic lens 10 is made to focus on the object, and the shutter time is determined (S18). The details of the range finding and photometering will be described later. The range finding and photometering operations are repeatedly performed (S18) until the release switch 64 is turned on while the range finding and photometering switch is on.

When the release switch 64 is turned on, photographing is performed (S20). The details will be described later with reference to the second embodiment. After one photograph is taken, image data is read out from the buffer memory 22. Data on the photographed image is written in the information data area 32 via the connector 36 and the interface 34 of the memory card 28, and management data on the photographed image (i.e., the image recorded in the information data area) is written in the management data area 30. If, however, the hard disk 80 is connected, the data on the photographed image is written in the information data area 84 via the connector 88 and the interface 86 of the hard disk 80, and management data on the photographed image (i.e., the image recorded in the information data area) is written in the management data area 82 (S21).

In step S22, if the photographing is to be continued in the continuous mode, the process returns to step S17; if the photographing is not in the continuous mode or the continuous photographing is to be stopped, the process returns to step S2.

Next, the second embodiment of the present invention will be explained.

Figure 7:
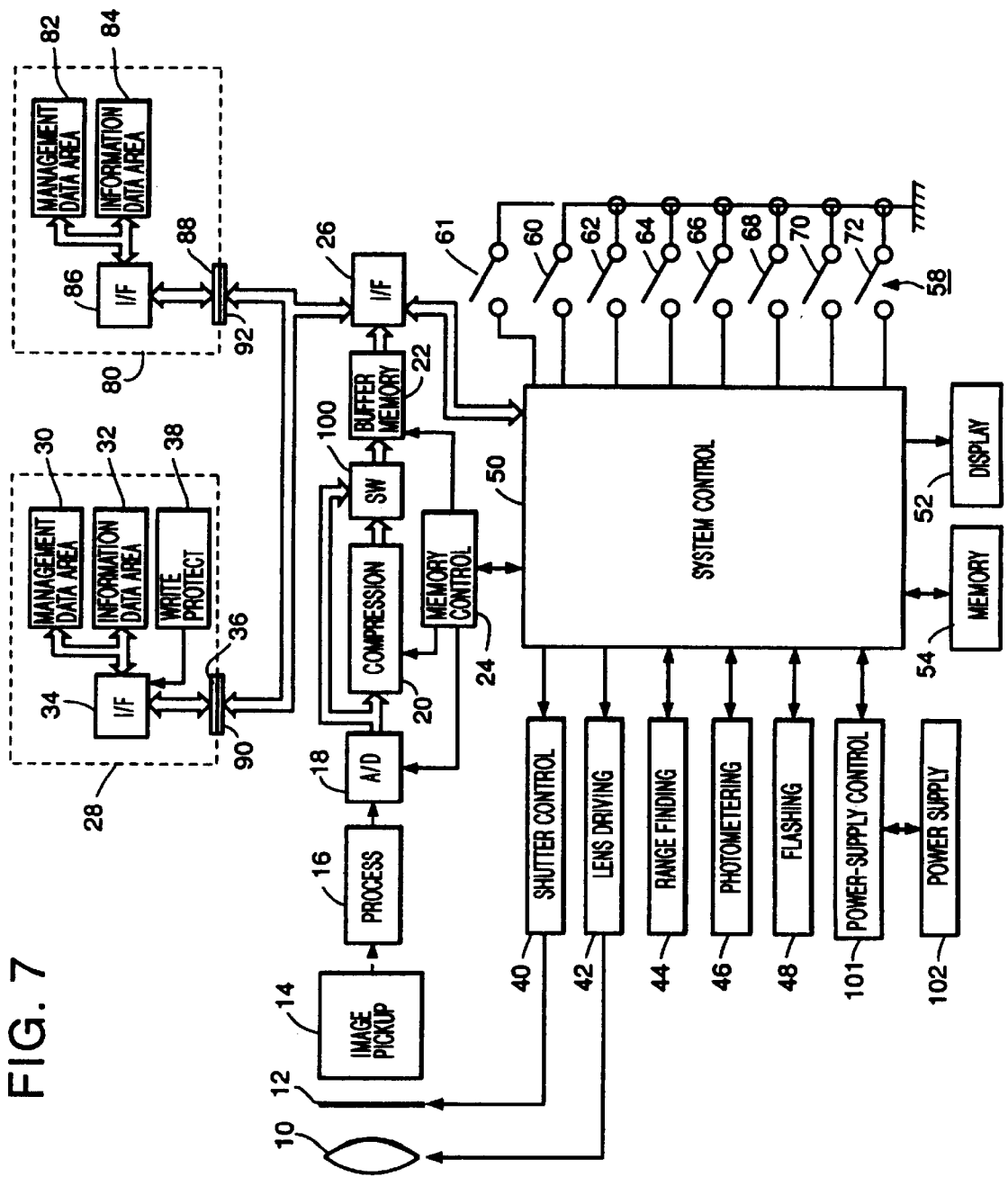
FIG. 7 is a block diagram in accordance with another embodiment of the present invention.

Referring to FIG. 7, reference numerals 90 and 92 denote connectors. Blocks designated by the same reference numerals as those in FIG. 1 have the same function, and thus further explanation thereof is omitted. In FIG. 7, reference numeral 46 denotes a switch for setting which medium is to be connected from among a plurality of connected media.

The operation of the second embodiment will be explained with reference to FIGS. 4, 5, 6, 8 and 9.

Figure 8:
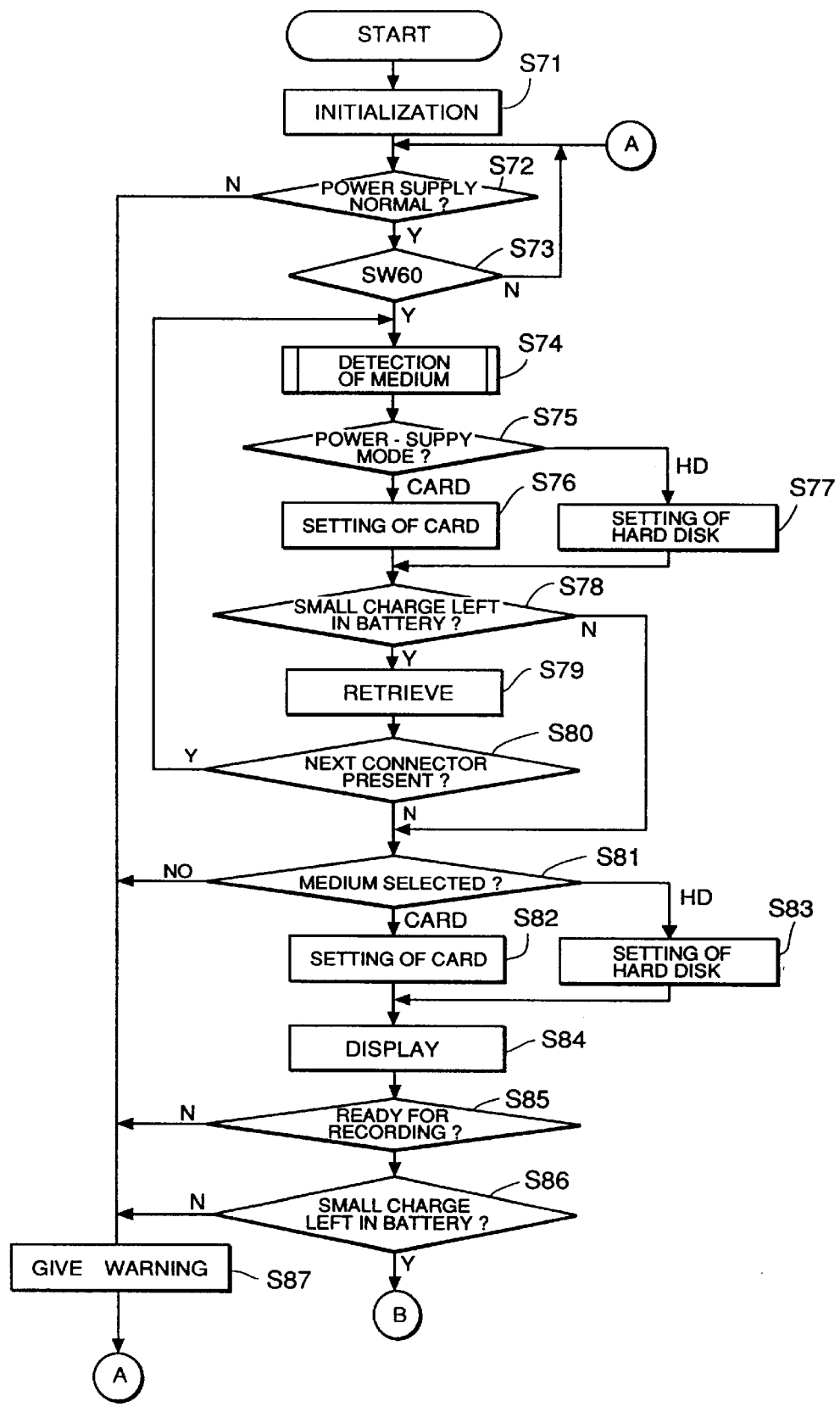
FIG. 8 is a part of a flowchart of the main routine in accordance with the above embodiment of the present invention.
Figure 9:
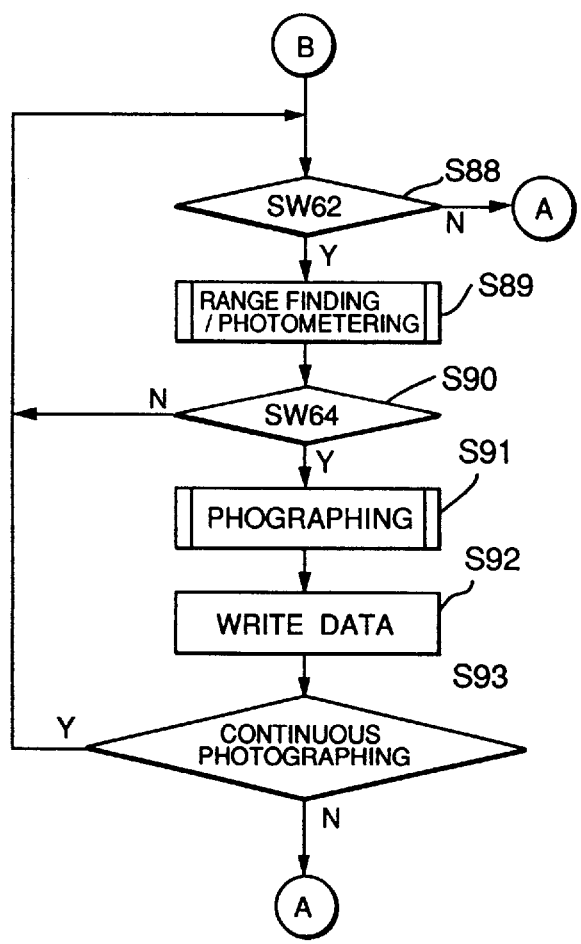
FIG. 9 is a part of the flowchart of the main routine in accordance with the above embodiment of the present invention.

FIGS. 8 and 9 together show a flowchart of the main routine of this embodiment. A new feature of the flowchart of this embodiment is that an operation for a plurality of connectors is performed.

When the power supply is turned on, the system control circuit 50 initializes flags, control variables or the like (S71), and checks the state of the power supply (S72), and whether the memory card 28 or the hard disk 80 is connected (S74). The details of this operation for detecting a medium will be described later.

If the state of the power supply is not normal, for example, a battery is not mounted or the amount of the charge left in the battery is exceedingly small, a warning is displayed on the display device 52 (S87), then the process returns to Flow A, and the power supply is checked in step S72, the process then waiting for the main switch 60 to be operated in S73.

Control variables used for the detection and control operation by the power-supply control circuit 101, and the mode setting are switched (S76 and 77) in accordance with the medium identification flag set at the medium detection operation S74. As a result, a threshold value which is a reference for an operation for giving a warning and for an operation for inhibiting recording due to the insufficient amount of the charge left in the battery is set appropriately according to the type of the connected medium.

For example, a large electric current is required at start-up time when the hard disk 80 is connected, whereas no large electric current is required when the memory card 28 is connected. When the amount of the charge left in the battery is small, the operation for giving a warning regarding the amount of the charge left in the battery and the operation for inhibiting recording must be performed when the hard disk 80 is connected. When the memory card 28 is connected, in a case where recording can be continued without performing the above operations, recording must be inhibited if a threshold value is fixed despite the fact that the charge left in the battery is sufficient for recording when a memory card is connected. This embodiment can deal with any case in which any medium is connected by switching such threshold values.

The amount of the charge left in the battery 102 is detected by the power-supply control circuit 101 (S78) on the basis of the value set at step S76 or S77 corresponding to the connected medium. If the amount of the charge left in the battery is sufficient, the management data of the memory card 28 or the hard disk 80 is retrieved (S79). If it is insufficient, the retrieval operation in step S79 is skipped.

Next, in step S74, the system control circuit 50 detects whether the memory card 28 or the hard disk 80 is connected to the connector 92. The operations from steps S74 to S79 are performed in the same manner as for the connector 90. In this embodiment, the status of each of a plurality of connected connectors is checked as described above.

When all the connectors have been detected and retrieved in step S80, which of the memory card 28 or the hard disk 80 is currently set as the medium to be used is detected in step S81, and then the setting of the operation mode and the display mode is switched in accordance with the setting of the medium in steps S82 and S83. If necessary, the setting of the memory card 28 or the hard disk 80 may be switched by means of the switch 6 to whichever one of them not set at present on the basis of the result of the retrieval of the medium and the detection of the amount of the charge left in the battery.

If the setting of a medium cannot be performed because neither the memory card 28 nor the hard disk 80 is connected, or because neither the memory card 28 nor the hard disk 80 can be retrieved because the battery is weak, a warning is displayed on the display device 52 in step S87, and the power supply is checked in step S72, the process then waiting for the main switch 60 to be operated in step S73.

The number of frames, date, the operation mode and the like are displayed (S84) on the basis of the switched setting of the mode in accordance with the management data, the mode set by the group of switches 58 and the medium identification flag. If it is determined in step S85 that no free area for recording is available in the information data area 32 or the information data area 84, and if it is determined in step S86 that no charge sufficient for recording is left in the battery on the basis of the value set in step S76 or S77 corresponding to the connected medium, a warning is displayed in step S87, the power supply is checked in step S72 and the process waits for the main switch 60 to be operated in step S73.

If, in step S88, the range finding/photometering switch 62 is off, the process returns to step S72; if it is on, range finding and photometering operations are performed by the range finding circuit 44 and the photometering circuit 46, respectively. The photographic lens 10 is made to focus on the object, and shutter time is determined (S89). The details of these range finding and photometering operations will be described later. The range finding and photometering operations are repeatedly performed (S89) until the release switch 64 is turned on (S90) while the range finding and photometering switch is on.

Next, upon turning on the release switch 64, an image pick-up operation is performed (S91). The details of the image pick-up operation will be described later. After one image frame is produced, image data is read out from the buffer memory 22. Data on the photographed image is written in the information data area 32 via the interface 26 and the connector 90 and via the connector 36 and the interface 34 of the memory card 28 when the memory card 28 is connected, and management data on the photographed image (i.e., the image recorded in the information data area) is written in the management data area 30. If, however, the hard disk 80 is connected, the data on the photographed image is written in the information data area 84 via the connector 88 and the interface 86 of the hard disk 80, and management data on the photographed image (i.e., the image recorded in the information data area) is written in the management data area 82 (S92).

If, in step S93, the photographing operation is to be continued in the continuous mode, the process returns to step S88; if the photographing is not in the continuous mode or the continuous photographing is to be stopped, the process returns to step S72.

Figure 4:
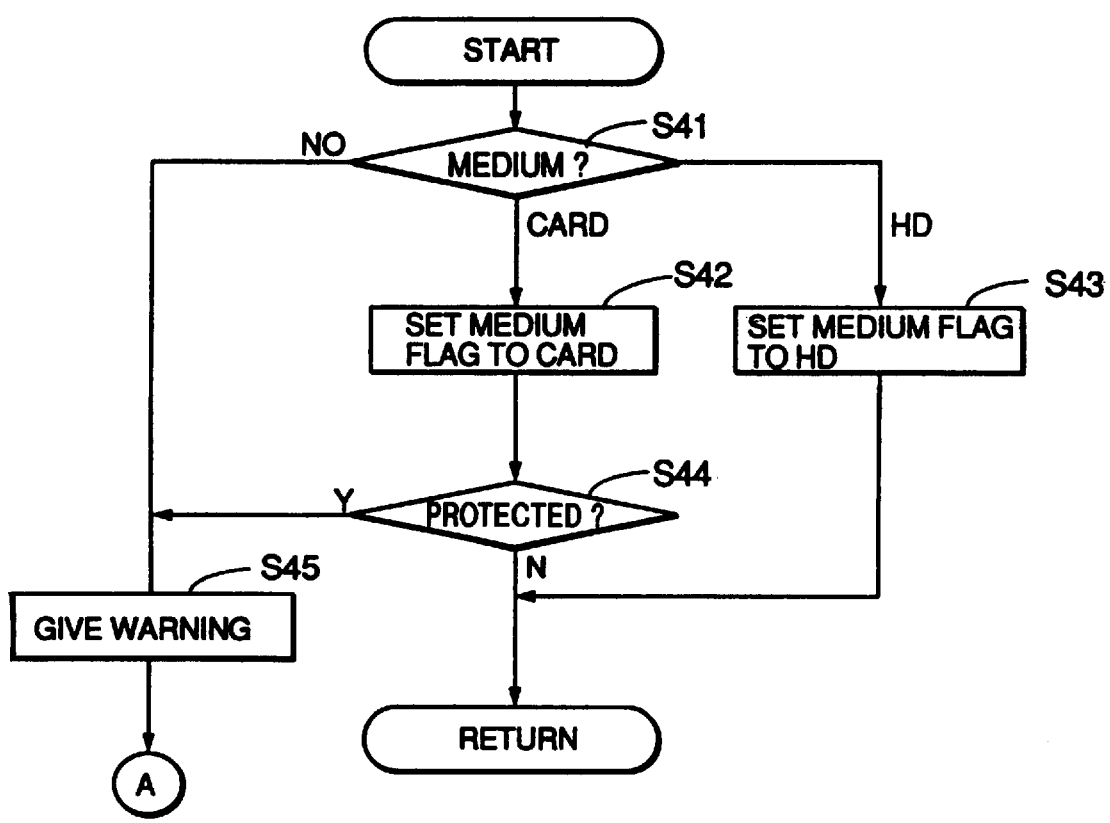
FIG. 4 is a recording flowchart of a medium detection routine in accordance with the embodiment of the present invention.

FIG. 4 shows a detailed flowchart of the medium detection in step S4 of FIG. 2 and in step S74 of FIG. 8.

It is determined in step S41 whether the memory card 28 or the hard disk 80 is connected, and the medium identification flag is set in steps S42 and S43 according to the result of such identification. When the memory card 28 is connected, the write protect 38 is read via the interface 26 and the connector 90, and via the connector 36 and the interface 34 (S44). When the memory card 28 is not write-protected and the hard disk is connected, the medium detection routine is terminated. If the write protect 38 has been set, a warning is displayed (S45), the power supply is checked in steps 2 and 72, the process then waiting for the main switch 60 to be operated in steps S3 and S73.

Figure 5:
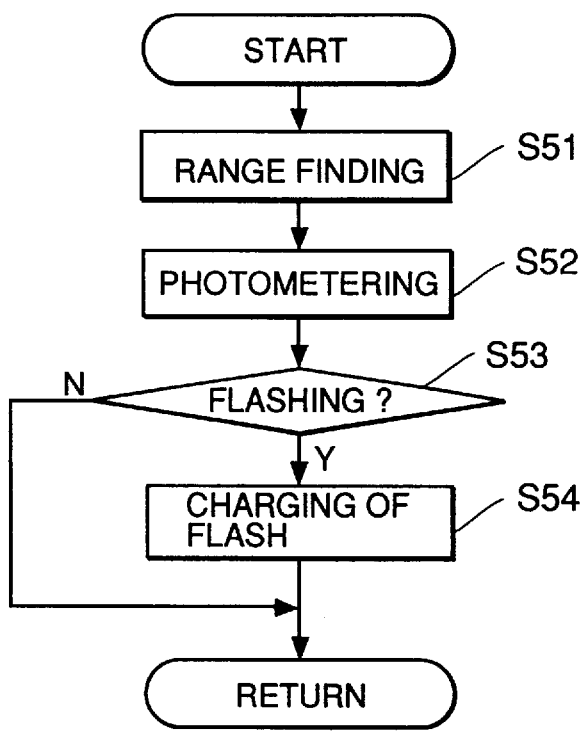
FIG. 5 is a flowchart of a range finding/photometering routine in accordance with the embodiment of the present invention.

FIG. 5 shows a detailed flowchart of the range finding and photometering operations in step S18 of FIG. 3 and in step S89 of FIG. 9. The distance to the object is measured by the range finding circuit 44, and the measured data is stored in the memory 54 (S51). The brightness of the object is measured by the photometering circuit 46, and the measured data is stored in the memory 54 (S52). If necessary, a flash flag is set, and the flash 48 is charged in step S54.

Figure 6:
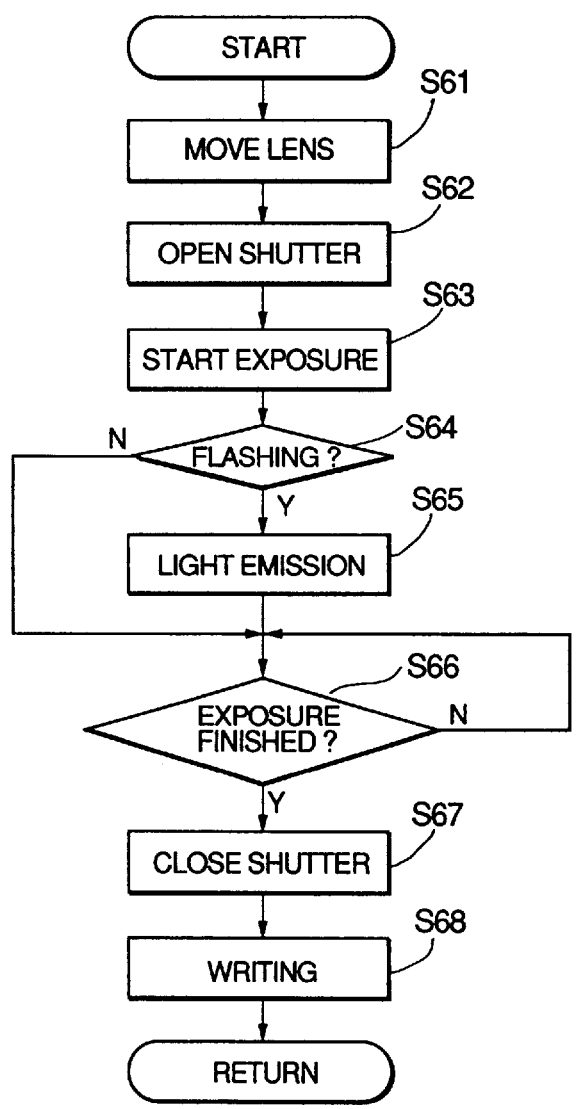
FIG. 6 is a flowchart of recording images in accordance with the embodiment of the present invention.

FIG. 6 shows a detailed flowchart of the image pick-up operation in step S20 of FIG. 3. The system control circuit 50 reads out data on the distance to the object stored in the memory 54, and causes the lens driving circuit 40 to drive the focusing lens of the photographic lens 10 in order to focus on the object (S61). The shutter 12 is opened by the shutter control circuit 40 in accordance with photometered data stored in the memory 54 so that an image-pickup element 14 is exposed (S62 and S63). A determination is made in step S64 whether the flash 48 is required on the basis of the flash flag. When necessary, the flash 48 is made to emit light in step S65. Upon the termination of the exposure of the image pick-up element 14 (S66), the shutter 12 is closed in step S67, and charge signals are read from the image pick-up element 14. When data is to be compressed, data on the produced image is written in the buffer memory 22 via both the image compression circuit 20 and the switch 100. When data is not to be compressed, the data is written in step S68 in the buffer memory 22 via only the switch 100.

Although in the above-described embodiment an explanation has been provided assuming that both the memory card 28 and the hard disk 80 may be separate from the main body of the recording apparatus and connected thereto as desired, no problem is posed even if either the memory card 28 or the hard disk 80, or both of them are fixed to the main body of the recording apparatus.

As can be easily understood from the above explanation, according to this embodiment, means for detecting the amount of the charge left in the battery and means for connecting a plurality of different types of recording media are provided. A determination is made whether a connected recording medium is a solid-state memory element, and whether it is a magnetic recording medium, an opto-magnetic recording medium, or an optical recording medium. The mode of the recording apparatus when the amount of the charge left in the battery is small may be switched appropriately on the basis of the result of the determination so that recording can be performed.

In addition, means for detecting the amount of the charge left in the battery, and means for connecting a plurality of different types of recording media are provided. When both a memory card and a hard disk are connected, the mode of the recording apparatus when the amount of the charge left in the battery is small may be switched appropriately depending upon whether the selected recording medium is a fixed memory element, a magnetic recording medium, an opto-magnetic recording medium, or an optical recording medium.

Next, another embodiment of the present invention will be explained with reference to FIG. 10.

Figure 10:
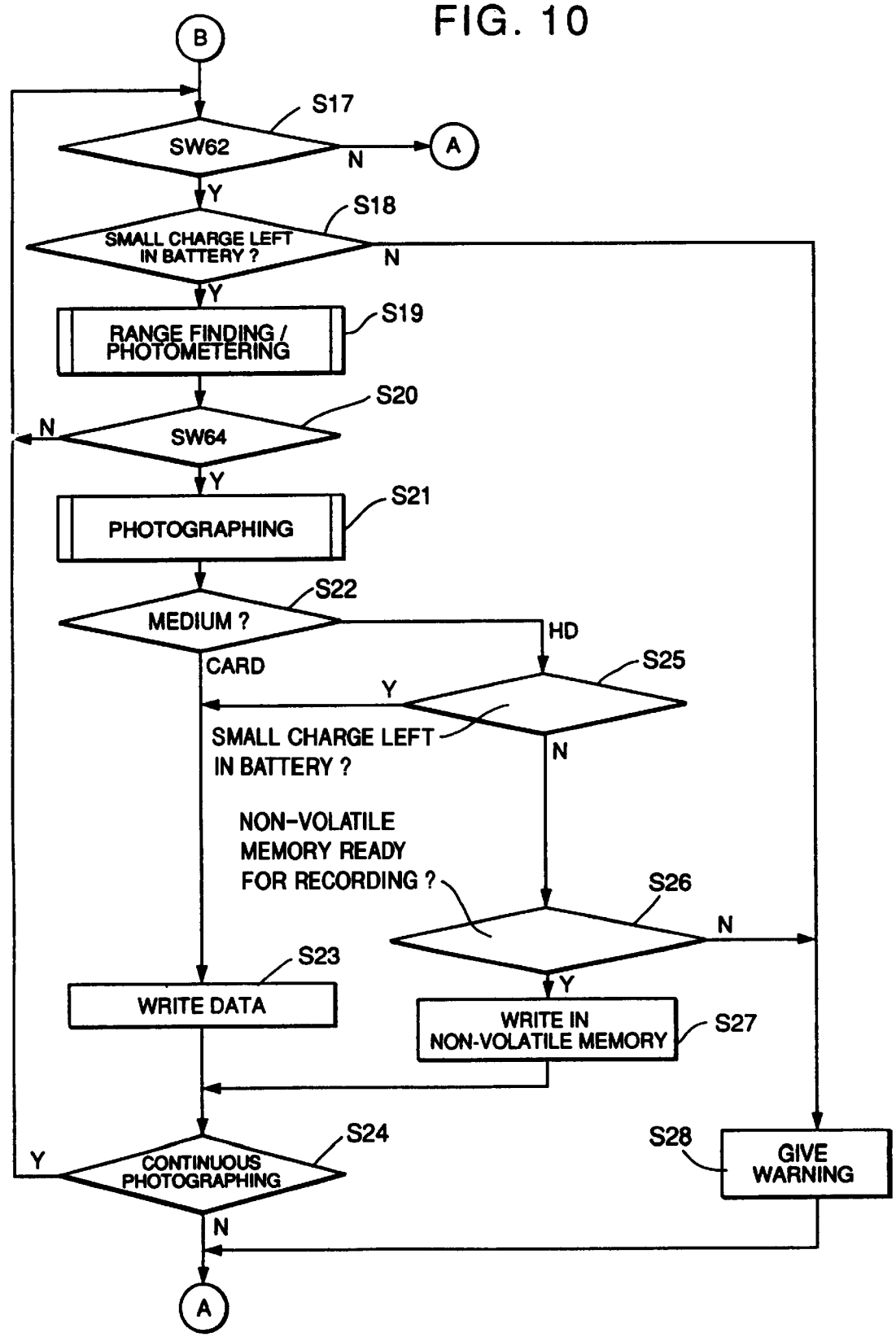
FIG. 10 is a flowchart showing another embodiment of that of FIG. 3.

FIG. 10 is a flowchart showing another embodiment of that of FIG. 3.

If the range finding/photometering switch 62 is off in step S17, the process returns to Flow A, i.e., step S2 of FIG. 2. If it is on, the amount of the charge left in the battery is checked in step S18, and thereafter range finding and photometering is performed by the range finding circuit 44 and the photometering circuit 46, the photographic lens 10 is made to focus on the object, and the shutter time is determined in step S19. The details of the this range finding and photometering operations will be described later with reference to FIG. 9. The range finding and photometering operations are repeatedly performed in step S19 until the release switch 64 is turned on while the range finding and photometering switch 62 is on in step S20. If no sufficient amount of the charge is left in the battery in step S18, a warning is displayed in step S28, the power supply is checked in step S2, the process then waiting for the main switch 60 to be operated in step S3.

When the release switch 64 is turned on, an image pick-up operation is performed in step S21. The details of the image pick-up operation will be described later. After one image pick-up operation is performed, the system control circuit 50 causes the power supply circuit 101 to detect the amount of the charge left in the battery of a power supply 102 (S25) on the basis of the value set at step S6 and S7, mentioned with reference to FIG. 2, corresponding to the connected medium if the medium identification flag has been set to a hard disk in the medium detection operation S4 (S22). If the amount of the charge left in the battery is sufficient, image data is read out from the buffer memory 22. Data on the produced image is written in the information data area 84 via the interface 26, the connector 90, and the connector 88 and the interface 86 of the hard disk 80, and the management data on the produced image (i.e., the image recorded in the information data area) is written in the information data area 84 (S23).

If it is determined in step S22 that the medium identification flag is set to a card, that is, the connected medium is a card memory, in the above-described step of detecting a medium, image data is read from the buffer memory 22. Data on the produced image is written in the information data area 32 via the interface 26, the connector 90, and the connector 36 and the interface 34 of the memory card 28, and management data on the produced image (i.e., the image recorded in the information data area) is written in the management data area 30 (S23).

If no sufficient amount of the charge is left in the battery in step S25, the system control circuit 50 checks whether a capacity sufficient for recording the produced image is available in a non-volatile memory 106 (S26). If the capacity is sufficient, the produced image data and the management data are written in the non-volatile memory 106 in step S27. If no sufficient amount of the charge is left in the battery, a warning is displayed in step S28, the process returns to the above-mentioned Flow A, the power supply is checked in step S32, the process then waiting for the main switch 60 to be operated in step S33.

After data is written in the card memory connected as described above in step S23 or in the non-volatile memory 106 in step S27, in step S24, the process returns to step S17 if the image pick-up operation is to be continued; if the photographing is not in the continuous mode or the continuous photographing is to be stopped, the process returns to step S2.

Although in the above-described embodiment the operation mode of the apparatus is switched between the recording stop mode and the recording ready mode by varying the inhibition voltage of the power supply for stopping the recording operation of the apparatus according to the type of the medium, the present invention is not limited to this case. Another operation mode, for example, the continuous photographing may be switched, or the number of picture surfaces may be switched in accordance with a single recording trigger.

Next, yet another embodiment of the present invention will be explained with reference to the flowchart of FIG. 11. If it is determined in step S88 that the range finding/photometering switch 62 is off, the process returns to step S72; if it is on, the amount of the charge left in the battery is checked in step S89, the range finding and photometering operations are performed by the range finding circuit 44 and the photometering circuit 46, respectively. The photographic lens 10 is made to focus on the object, and the shutter time is determined (S90). The details of the range finding and photometering operations will be described later. The range finding and photometering operations are repeatedly performed in step S90 until the release switch 64 is turned on in step S91 while the range finding and photometering switch 62 is on. If no sufficient amount of the charge is left in the battery in step S89, a warning is displayed in step S101, the power supply is checked in step S72, the process then waiting for the main switch 60 to be operated in step S73.

When the release switch 64 is turned on, an image pick-up operation is performed in step S92. The details of the image pick-up operation will be described later. After one image pick-up operation is performed, the system control circuit 50 causes the power supply circuit 102 to detect the amount of the charge left in the battery 104 in step S96 on the basis of the value set in step S77 of FIG. 8 corresponding to the connected medium if it is determined in step S96 that the medium identification flag has been set to a hard disk in the medium detection operation S74. If a sufficient amount of the charge is left in the battery, image data is read from the buffer memory 22. Produced image data is written in the information data area 84 via the interface 26, the connector 90, and the connector 88 and the interface 86 of the hard disk 80, and in step S94, management data on the produced image (i.e., the image recorded in the information data area) is written in the management data area 82.

If it is determined in step S93 that the medium identification flag is set to a card in the medium detection operation S74, image data is read from the buffer memory 22. In step S94, produced image data is written in the information data area 32 via the interface 26, the connector 90, and the connector 36 and the interface 34 of the memory card 28, and produced image (i.e., the image recorded in the information data area) is written in the management data area 30.

In step S96, if no sufficient amount of the charge is left in the battery, a determination is made by the system control circuit 50 in step S97 whether the memory card 28 is connected. If recording is possible, in step S98, control variables used for the detection and control operation by the power supply circuit 102 are set, the operation mode and the display mode are switched, and data is written in step S94.

When it is impossible to record on the memory card 28, a check is made in step S99 by the system control circuit 50 whether a capacity sufficient for recording the produced image is available in the non-volatile memory 106. If it is sufficient, in step S100, produced image data and management data are written in the non-volatile memory 106. If the capacity of the non-volatile memory 106 is insufficient, a warning is displayed in step S101. The process returns to Flow A, the power supply is checked in step S72, the process then waiting for the main switch 60 to be operated in step S73.

Data is written in the above-described selected recording medium in step S94 or in the non-volatile memory 106 in step S100. Thereafter, in step S95, when the image pick-up operation is to be continued in the continuous mode, the process returns to step S88; when the mode is not the continuous mode or when the continuous mode is to be stopped, the process proceeds to Flow A, and the process returns to step S72.

According to this embodiment, there are provided means for detecting the amount of the charge left in the battery, non-volatile solid-state memory elements, and means for connecting recording media. Thus, when it is determined that the amount of the charge left in the battery is small for recording on a recording medium when the amount of the charge left in the battery is detected, recording can be performed on a non-volatile solid-state memory element within the main body of the apparatus.

In addition, there are provided means for detecting the amount of the charge left in the battery, non-volatile solid-state memory elements, and means for connecting a plurality of different types of recording media. Thus, a determination is made whether the connected recording medium is a solid-state memory element, a magnetic recording medium, an opto-magnetic recording medium or an optical recording medium. When it is determined that the amount of the charge left in the battery is insufficient for recording on the recording medium on the basis of the result of the determination and the result of the detection, data can be recorded on a non-volatile solid-state memory element.

In addition, there are provided means for detecting the amount of the charge left in the battery, non-volatile solid-state memory elements, and means for connecting a plurality of different types of recording media. When both a memory card and a hard disk are connected, a determination is made whether the connected recording medium is a solid-state memory element, a magnetic recording medium, an opto-magnetic recording medium, or an optical recording medium. When it is determined that the amount of the charge left in the battery is insufficient for recording on the recording medium on the basis of the result of the determination and the result of the detection, data can be recorded on a non-volatile solid-state memory element.

In addition, there are provided means for detecting the amount of the charge left in the battery, non-volatile solid-state memory elements, and means for connecting a plurality of different types of recording media. When both a memory card and a hard disk are connected, a determination is made whether the connected recording medium is a solid-state memory element, a magnetic recording medium, an opto-magnetic recording medium, or an optical recording medium. When it is determined that the amount of the charge left in the battery is insufficient for recording on the recording medium on the basis of the result of the determination and the result of the detection, the most appropriate recording medium is selected. When it is determined that the amount of the charge left in the battery is small on the basis of the result of the selection and the result of the detection of the amount of the charge left in the battery, data can be recorded on a non-volatile solid-state memory element.

According to this embodiment, recording can be performed for various purposes. Although in the above-described embodiments an example in which an electronic camera is used has been explained, the present invention is not limited to this example. For example, it can be applied to word processors, facsimiles, computers, telephone sets and the like.

Solid-state memories, such as semiconductor memories or block line memories, may be used as static memories in the present invention. Magnetic or optical media may be used as dynamic memories. The memory may be in the shape of tape, disk or card.

As described above, according to the present invention, by effectively using the performance of a power supply, recording can be performed in various situations.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An image information recording apparatus for inputting image information and recording the input image information, connectable to plural types of recording media having different power consumption characteristics, operated by a power supplied from a system power source, and recording the image information on a connected recording medium, said image information recording apparatus comprising:

input means for inputting the image information;

recording means for recording on the connected recording medium the image information input by said input means;

detecting means for detecting a status of a system power supply in the system power source prior to a recording operation of the image information by said recording means;

determination means for determining a type of the recording medium connected to said image information recording apparatus from among the plural types of recording media; and control means for controlling a detecting operation of the status of the system power supply in the system power source by said detecting means in accordance with the determination by said determination means.

2. An image information recording apparatus according to claim 1, wherein said detecting means is arranged so as to detect a voltage of a battery in the power source.

3. An image information recording apparatus according to claim 1, wherein the plural types of recording media include a static memory device and a dynamic memory device, and wherein said determination means is arranged so as to determine whether the recording medium connected to said image information recording apparatus is the static memory device or the dynamic memory device.

4. An image information recording apparatus according to claim 3, wherein said detecting means is arranged so as to detect the status of the power supply in the power source and to stop an operation of said image information recording apparatus in accordance with the detected status of the power supply prior to the recording operation of the image information by said recording means, and said control means is arranged so as to control said detecting means to stop the operation of said image information recording apparatus in accordance with the determination by said determination means when the status of the power supply is at a predetermined level.

5. An image information recording apparatus for inputting image information, simultaneously connectable to a static memory device and a dynamic memory device, operated by a power supplied from a power source, and recording the image information on a connected recording medium, said image information recording apparatus comprising:

input means for inputting the image information;

recording means for recording the image information input by said input means on either one of the static memory device and the dynamic memory device connected to said image information recording apparatus;

detecting means for detecting a status of a power supply in the power source prior to a recording operation of the image information by said recording means; and control means for controlling said recording means so as to record image information on at least one of the static memory device and the dynamic memory device connected to said image information recording apparatus in accordance with the detection by said detecting means.

6. An image information recording apparatus according to claim 5, wherein said detecting means is arranged so as to detect a voltage of a battery in the power source.

7. An image information recording apparatus according to claim 5, wherein the dynamic memory device includes an opto-magnetic recording medium.

8. An image information recording apparatus according to claim 5, further comprising storage means for storing information relating to characteristics of the recording media simultaneously connected to said image information recording apparatus.

9. An image information recording apparatus according to claim 8, wherein said control means is arranged so as to select any one of the connectable recording media corresponding to any one of the characteristics stored by said storage means and so as to control said recording means to record image information on the selected recording medium.

10. An image information recording apparatus for inputting image information and recording the input image information, simultaneously connectable to a static memory device and a dynamic memory device, operated by a power supplied from a power source, and recording the image information on a connected static memory device and a connected dynamic memory device, said image information recording apparatus comprising:

input means for inputting the image information;

recording means for recording the image information input by said input means on either one of the static memory device and the dynamic memory device connected to said image information recording apparatus;

detecting means for detecting a status of a power supply in the power source prior to a recording operation of the image information by said recording means; and control means for controlling said recording means so as to record image information on either one of the static memory device and the dynamic memory device connected to said image information recording apparatus in accordance with the detection by said detecting means.

11. An image information recording apparatus according to claim 10, wherein said detecting means is arranged so as to detect the status of the power supply from a battery in the power source prior to the recording operation of the image information by said recording means, and wherein said control means is arranged so as to control said recording means to record information on the static memory device connected to said image information recording apparatus when a predetermined status of the battery in the power supply is detected by said detecting means.

12. An image information recording apparatus according to claim 10, wherein the dynamic memory device includes at least one of a magnetic recording media and an optical recording media.

13. An image information recording apparatus according to claim 10, wherein the static memory device comprises a non-volatile solid-state memory element.

14. An image information recording apparatus according to claim 1, wherein said detecting means is arranged so as to detect a voltage of a battery in the power source.

15. Apparatus for inputting image information and recording the input image information, said apparatus being connectable to a plurality of different kinds of recording media which consume different amounts of electrical power, said apparatus being operated by electric power supplied from a power supply, said apparatus for recording the image information to the connected recording medium, said apparatus comprising:

image information input means for inputting image information;

recording means for recording the image information input by said image information input means to a recording medium connected to the apparatus;

detection means for detecting a status of electric power supplied from the power supply, prior to the recording operation of the recording means;

determination means for determining the type of recording medium connected to said apparatus from among the plurality of different recording media; and control means for controlling the recording operation of the recording means in accordance with the detection result of said detection means and a determination result of said determination means.

16. Apparatus according to claim 15, wherein the power supply comprises a battery, and wherein said detection means detects a voltage of the battery.

17. Apparatus according to claim 15, wherein the plurality of different recording media includes a static memory and a dynamic memory, and wherein said determination means determines whether the recording medium connected to the apparatus is a static memory or a dynamic memory.

18. Apparatus according to claim 17, wherein said control means prohibits the recording operation of said recording means in accordance with a level of electric power supplied from the power supply detected by said detection means, prior to the recording operation of the recording means, and wherein said control means controls the recording means to prohibit the recording operation when the status of the electric power supplied from the power supply detected by said detection means reaches a first level in the case that the determination means determines that the image information recording apparatus is connected to a dynamic memory, and wherein said control means controls the recording means to prohibit the recording operation when the status of the electric power supplied from the power supply detected by said detection means reaches a second level, lower than the first level, in the case that the determination means determines that the image information recording apparatus is connected to a static memory.

19. Apparatus according to claim 17, wherein said control means provides a warning that the recording operation of said recording means is impossible in accordance with the level of the electric power supplied from the power supply detected by said detection means, prior to the recording operation of the recording means, and wherein said control means controls the recording means to provide a warning that the recording operation is impossible when the status of the electric power supplied from the power supply detected by said detection means reaches a first level in the case that said determination means determines that the image information recording apparatus is connected to a dynamic memory, and wherein said control means controls said recording means to provide a warning that the recording operation is impossible when the status of the electric power supplied from the power supply detected by said detection means reaches a second level, lower than the first level, in the case that the determination means determines that said image information recording apparatus is connected to a static memory.

20. Apparatus for inputting image information and recording the input image information, said apparatus being connectable to a plurality of different kinds of recording media which consume electric power differently from each other, said apparatus being operated by electric power supplied from a power supply, said apparatus for recording the image information to the connected recording medium, said apparatus comprising:

image information input means for inputting image information;

indication means for indicating to which recording medium, among the plurality of different kinds of recording media connectable to the apparatus, the image information input by said image information input means is recorded;

recording means for recording the image information input by said image information input means to the recording medium indicated by said indication means;

detection means for detecting a status of the electric power supplied from the power supply, prior to the recording operation of the recording means;

control means for controlling the recording operation of the input image information to the indicated recording medium in accordance with a result of the detection by said detection means.

21. Apparatus according to claim 20, wherein the power supply includes a battery, and wherein said detection means detects a voltage of the battery.

22. Apparatus according to claim 20, wherein the plurality of different kinds of recording media include a static memory and a dynamic memory, and wherein said indication means indicates one of said static memory and said dynamic memory for recording the input image information.

23. Apparatus according to claim 22, wherein said control means controls said recording means to record the input image information in either the static memory or the dynamic memory indicated by said indication means, in accordance with a result of detection by said detection means.

24. Apparatus according to claim 22, wherein said dynamic memory comprises an optical magnetic recording medium.

25. Apparatus according to claim 22, wherein said control means inhibits the recording operation of the input image information to the recording medium indicated by said indication means, in accordance with a level of the electric power supplied from the power supply detected by said detection means, prior to the recording operation, and wherein said control means inhibits the recording operation of the recording means when the status of the electric power supplied from the power supply detected by said detection means reaches a first level in the case that said indication means has indicated that the image information input by said image information input means is recorded in said dynamic memory, and wherein said control means inhibits the recording operation when the status of the electric power supplied from the power supply detected by said detection means reaches a second level, lower than the first level, in the case that said indication means indicates that the image information input by the image information input means is recorded in the static memory.

26. Apparatus according to claim 22, wherein said control means provides a warning that the recording operation of the input image information to the recording medium indicated by said indication means, in accordance with a level of the electric power supplied from the power supply detected by said detection means, prior to the recording operation, and wherein said control means provides a warning that the recording operation of the input image information is impossible when the status of the electric power supplied from the power supply detected by said detection means reaches a first level in the case that said indication means indicates that the input image information is recorded to the dynamic memory, and wherein said control means inhibits the recording operation of said recording means when the status of the electric power supplied from the power supply detected by said detection means reaches a second level, lower than the first level, in the case that said indication means indicates that the input image information is recorded to said static memory.

27. Apparatus for inputting image information and recording the input image information, said apparatus being connectable to a static memory and to a dynamic memory at the same time, said apparatus being supplied with electric power from a power supply, said apparatus recording the image information to the connected static memory and dynamic memory, said apparatus comprising:

image information input means for inputting image information;

indication means for indicating to which of the connected static memory or the connected dynamic memory the input image information is recorded;

recording means for recording the input image information to the memory indicated by said indication means to record the input image information in at least one of the connected static memory and the connected dynamic memory;

detection means for detecting the electric power supplied from the power supply, prior to the recording operation of the recording means;

control means for controlling the recording operation of the input image information to the indicated memory in accordance with a result of the detection by said detection means.

28. Apparatus according to claim 27, wherein the power supply includes a battery, wherein said detection means detects the status of the electric power supplied from said battery, prior to the recording operation by said recording means, and wherein said control means inhibits the recording operation to the indicated memory in accordance with the level of the electric power supplied from the power supply detected by said detection means, prior to the recording operation by the recording means, and wherein said control means controls said recording means to inhibit the recording operation when the status of the electric power supplied from the power supply detected by said detection means reaches a first level in the case that said indication means has indicated that the image information input by said image information input means is recorded to said dynamic memory, and wherein said control means controls said recording means to inhibit the recording operation when the status of the electric power supplied from the power supply detected by said detection means reaches a second level, lower than the first level, in the case that the indication means indicates that the image information input by said image information input means is recorded to said static memory.

29. Apparatus according to claim 27, wherein the power supply includes a battery, wherein said detection means detects the status of the electric power supplied from said battery, prior to the recording operation by said recording means, and wherein said control means provides a warning that the recording operation of the input image information to the indicated memory is impossible, in accordance with the level of the electric power supplied from the power supply detected by said detecting means, prior to the recording operation, and wherein said control means controls said recording means to provide a warning that the recording operation is impossible when the electric power supplied from the power supply detected by said detection means reaches a first level in a case that the indication means indicates that the input image information is recorded to said dynamic memory, and wherein said control means controls said recording means to provide a warning that the recording operation is impossible when the electric power supplied from the power supply detected by said detection means reaches a second level, lower than the first level, in the case that said indication means indicates that the input image information is recorded to said static memory.

30. Apparatus according to claim 27, wherein said dynamic memory includes one of a magnetic recording medium and an optical magnetic medium.

31. Apparatus according to claim 27, wherein said static memory includes a non-destructive, readable solid-state memory element.

32. Apparatus according to claim 27, wherein the power supply includes a battery, and wherein said detection means detects the voltage of said battery prior to the recording operation by said recording means.

\* \* \* \* \*

UNITED STATES PATENT AND TRADEMARK OFFICE
CERTIFICATE OF CORRECTION

PATENT NO. : 5,854,875

DATED : December 29, 1998

INVENTOR(S) : YOICHI YAMAGISHI

It is certified that error appears in the above-identified patent and that said Letters Patent is hereby corrected as shown below:

COVER PAGE [54] TITLE,
"APPARTUS" should read --APPARATUS--.
COLUMN 1,
Line 1, "APPARTUS" should read --APPARATUS--;
Line 29, "inexpensively." should read --inexpensive.--; and
Line 58, "medium. Detecting" should read --medium. The recording apparatus includes detecting--.
COLUMN 2,
Line 18, "recording flowchart of a" should read --flowchart of a recording--.
COLUMN 4,
Line 22, "102" should read --102,--.
COLUMN 8,
Line 60, "is" should read --are--.
COLUMN 13,
Line 66, "claim 1," should read --claim 10,--.

Signed and Sealed this

Fourteenth Day of September, 1999

Attest:

Q. TODD DICKINSON

*Attesting Officer*     *Acting Commissioner of Patents and Trademarks*